United States Patent [19]
Copeland

[11] Patent Number: 6,164,005
[45] Date of Patent: Dec. 26, 2000

[54] PORTABLE HUNTING BLIND

[75] Inventor: William F. Copeland, San Antonio, Tex.

[73] Assignee: Norma W. Copeland, San Antonio, Tex.

[21] Appl. No.: 09/080,948

[22] Filed: May 19, 1998

[51] Int. Cl.[7] .......................... A01M 31/00; A01M 31/06
[52] U.S. Cl. .................... 43/1; 40/606; 135/901
[58] Field of Search ................. 43/1; 135/901; 160/135; 40/606, 610

[56] References Cited

U.S. PATENT DOCUMENTS

| | | | |
|---|---|---|---|
| 2,992,503 | 7/1961 | Webb | 43/1 |
| 3,642,318 | 2/1972 | Avant | 297/184 |
| 3,709,237 | 1/1973 | Smith | 160/135 |
| 3,913,598 | 10/1975 | Glutting | 160/135 |
| 4,426,801 | 1/1984 | Gates | 40/606 |
| 4,516,620 | 5/1985 | Mulhern | 40/606 |
| 4,660,310 | 4/1987 | Farmer | 40/606 |
| 4,782,616 | 11/1988 | Hambleton | 43/1 |
| 4,885,860 | 12/1989 | Huenfeld | 40/606 |
| 5,062,234 | 11/1991 | Green | 43/1 |
| 5,592,960 | 1/1997 | Williams | 135/901 |

OTHER PUBLICATIONS

Texas Hunter® brochure (undated); pp. Cover, 2, and 5.
*Cabela's* Fall 1997 Catalog, pp. 418 and 425.
*Strongbuilt* 1998 Catalog p. 19.
*The Journal of the Texas Trophy Hunters,* Jan./Feb. 1997, p. 142.
*The Journal of the Texas Trophy Hunters,* Mar./Apr. 1997, pp. 23 and 130.

*Primary Examiner*—Kurt Rowan
*Attorney, Agent, or Firm*—Jackson Walker LLP

[57] ABSTRACT

A hunting blind consisting of a frame on which a fabric panel is mounted. The fabrics panel is made of least two plies, each ply having two surfaces, and each surface having a different design on the surface thereof. The plies are mounted to the frame so as to be reversible and therefore present four different appearances to the exterior of the hunting blind.

12 Claims, 3 Drawing Sheets

PORTABLE HUNTING BLIND

FIELD OF THE INVENTION

A portable hunting blind; more specifically, a portable hunting blind comprised of a pair of articulated frames covered with reversible fabric sleeves.

BACKGROUND OF THE INVENTION

Success in the sport of hunting is usually increased by the use of a hunting blind to help shield the hunter from view of the prey. Hunting blinds may be permanent or portable. Permanent hunting blinds typically include a rigid-wall, box-like structure mountable on legs for elevating the hunter above the ground and for protecting the hunter within the box from view of the prey. Ground-level hunting blinds are utilized for the hunter to sit, crouch, or stand behind or in. Portable hunting blinds are sometimes advantageous as they may be easily carried by a single hunter and set up at various locations throughout the day. Moreover, a portable hunting blind may be moved easily to change the position of the hunting blind with respect to the direction of view of the hunter.

One such portable hunting blind used for years is simply four poles and a loose sheet. The poles are staked into the ground and the sheet draped over it, forming a crude enclosure to shield the hunter from sight of the prey.

Applicant provides for a convenient, easily transported hunting blind that is simple to set up and stable and effective in shielding the hunter and provides an excellent surface for resting a camera or firearm.

Applicant's portable hunting blind is comprised of a 2 (or more)-panel folding screen. The panels articulate with one another and have legs at the bottom. The blind is set up with the legs pushed into the ground for stability, and the panels set up at an angle with one another in a generally "v" shape, behind which the hunter can sit, stand, or crouch when viewing the countryside. Unique to Applicant's multiple-panel blind is the use of multi-ply sleeves or covers that are reversible, having a variety of camouflage colors on the surfaces thereof so as to adapt to various terrain—woods, brush, sandy, rocky, etc. Moreover, the blind with multiple pivoting panels and reversible sleeves typically provides excellent concealment for the hunter while providing him with excellent visibility. With the sleeves able to slide off the frames of the panels and reversed or turned inside out, the hunter is presented with four different blind face combinations that will be suitable for almost any hunting environment. Applicant's screen is quick to set up, easily affordable, and allows the hunter to take maximum advantage of the natural cover and terrain.

As can be seen in the accompanying sheet of drawings, the folding screen/hunting blind consists of a frame typically comprised of ⅛" thickness mild steel angle iron ¾"×¾" width with the top and bottom corners braced with a square piece of ⅛" thick 2"×2" flat plate welded into each corner. A ½" diameter hole is drilled into each plate and the bottom of each leg is typically cut at an angle to facilitate pushing legs into the ground. The frames are comprised of two upright side rails, a top rail, and a bottom rail. The legs are typically 6" long, the width of the frame is typically 18" to 30" wide and the height is 30" to 60". The height should be sufficient so that a seated hunter can see and shoot over the top rail.

There is a 4-ply reversible sleeve that covers the frame. Each of the plies is fabric, with typically cotton, cotton blend, or synthetic in four different patterns. For example, on the accompanying sheet of drawings, side A is olive green camouflage, side B sand colored, side C mottled green and brown, and side D buff/gray/green mottled. Each of the two sleeves (to cover the two frames to a screen/blind) has the same four plies. Thus, the hunter, if in rocky terrain with a little vegetation and a lot of light sandstone, would use side B on the outside surface of the frame to face the area in which he anticipates the prey, or the hunter could choose to pout one of the other sides out, by either turning the sleeve inside out or turning it around on the frame (or turning the entire frame around). A two-ply sleeve could be used, and the hunter could use the appropriate design as the outward facing surface.

Grommets through each side of a cover allow the covers to be attached to the frame by running insulated solid copper wire through the grommets. In the same manner, adjacent panels can be held together by wire through the plies through the holes in the corner brace and through the grommets and holes in the adjacent panel, as illustrated in the accompanying sheet of drawings. This wire also functions as a hinge.

One set of two attached frames may be used as a blind by placing them on the ground in a "v" shape position in front of a suitable bush or tree so that it tends to blend in with the background, and therefore camouflage the hunter from the prey. Two sets of frames can be used as illustrated in the accompanying sheet of drawings to put adjacent one another to provide an enclosure to more completely surround the hunter. Further, there can be extra camouflage sheet panels (not shown) which likewise have the four plies but are utilized to fill the gap in a 2-blind setup where adjacent, unattached panels meet. By utilizing two extra 4-ply sheets to form a full enclosure between two 2-panel screens/blinds, a more complete cover is effected.

Since the two panels are easily foldable, they can be carried beneath the arm of a hunter and into the field. Moreover, when the panels are folded together, there is a nice pocket where the adjacent frames lay one against the other to store the stool and any other materials. Indeed, Applicant's portable hunting blind may include a folding camp stool with a back rest and a camouflage facemask or facemask/headcover to provide a complete kit for the hunter.

While the frame material is indicated to be angled iron, it may be any suitable material that is strong enough and light enough to carry into the field. Further, extra panels may be attached to the 2-panel blind for a blind with three or more panels. It is indicated that the sleeves be of multiple plies, each consisting of a separate design; but, it is reasonable to assume that the frame could be covered with less than four plies of material in varying patterns to reduce manufacturing cost.

OBJECTS OF THE INVENTION

It is an object of the present invention to provide a hunting blind with the ability to camouflage a hunter against a number of different backgrounds.

It is another object of the present invention to provide a portable hunting blind that will camouflage the hunter against different backgrounds.

It is yet another object of the present invention to provide a portable camouflage hunting blind included as part of a kit containing also a portable, foldable stool and a camouflage facemask or facemask/headcover made of netting.

SUMMARY OF THE INVENTION

These and other objects are provided for in a hunting blind consisting of multiple panels fastened together along complimentary edges, the panels made up of a frame covered with a fabric sleeve, the sleeve typically being 4-ply, that is, capable of being reversed on the frame, as well as pulled inside-out, thus providing four different patterns to best match a variety of different backgrounds.

DETAILED DESCRIPTION OF THE PREFERRED EMBODIMENT

Figure 1:
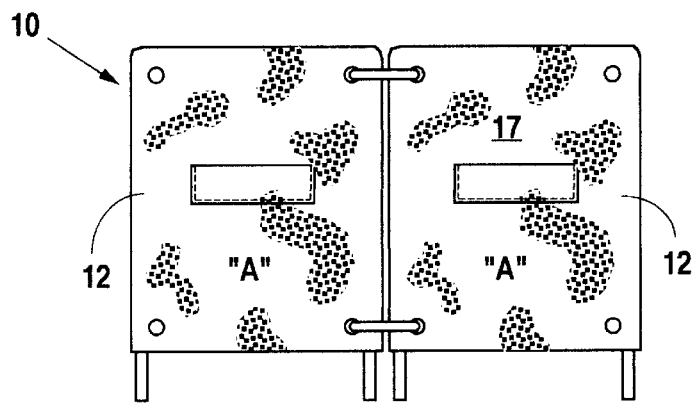
FIG. 1 is a front elevational view of the hunting blind of Applicant's present invention, which particular embodiment comprises two panels.

FIGS. 1–12 illustrate various applications of Applicant's present invention. FIG. 1 illustrates a typical embodiment of Applicant's hunting blind (10) being used by a hunter to help camouflage the hunter against his background. It is seen with reference to FIG. 1 that hunting blind (10) is typically comprised of a multiplicity of panels (12), here two panels being joined along complimentary sides by fastener means (14), such as solid copper insulated wire typically of 10 to 18 gauge. The use of wire or other suitable means to fasten adjacent pawls together in a flexible manner allows the blind to sit on slightly uneven ground while retaining its stability.

Figure 2:
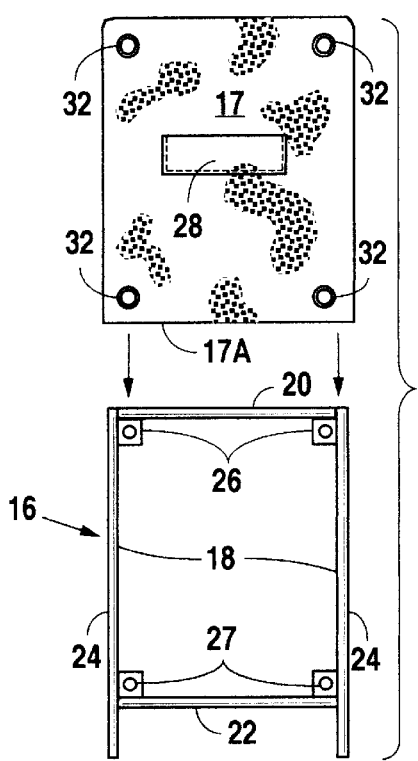
FIG. 2 is an exploded view of a single panel of the hunting blind of Applicant's present invention illustrating how the sleeve slides over the frame.

With reference to FIGS. 1 and 2, it is seen that each panel (12) is comprised of a rigid, typically metal frame (16), the frame being made of a multiplicity of members and being typically rectangularly shaped. Here it is seen that frame (16) is comprised of two vertically trending parallel side rails (18) joined by a transversely mounted top rail (20) and a transversely mounted bottom rail (22), the rails typically being comprised of angled iron and welded together or, in the alternative, wood or aluminum.

It is further seen that the frame is comprised of a pair of legs (24) depending downward from side rails (18) to provide support for the frame in the soil on which the blind is planted. Further, it is seen that the frame may include corner braces (26) which are tabular metal plates welded or otherwise fastened against adjacent side rails and top or bottom rails, as set forth in FIG. 2. It is seen that the corner braces may contain holes (27) through which fastener means (14) are inserted in a manner set forth more particularly below. A frame may be provided from a single piece of angle iron bent at 90° in two places forming a "U" shape with a piece of angle iron welded across from the side rails. Moreover, the legs can be cut at a 45° angle to facilitate pushing into the soil.

With further reference to FIG. 2, it may be seen how sleeves (17) having an open end (17a) and can slide over the frame so that the frame is contained within the interior (28a) of the sleeve. It is also seen that sleeves may have a pocket (28) sewn on walls (29) thereof.

Figure 4:
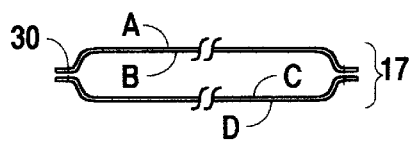
FIG. 4 is a side elevational view (partial view) of the four plies and the seam making up a sleeve of Applicant's present invention.
Figure 5:
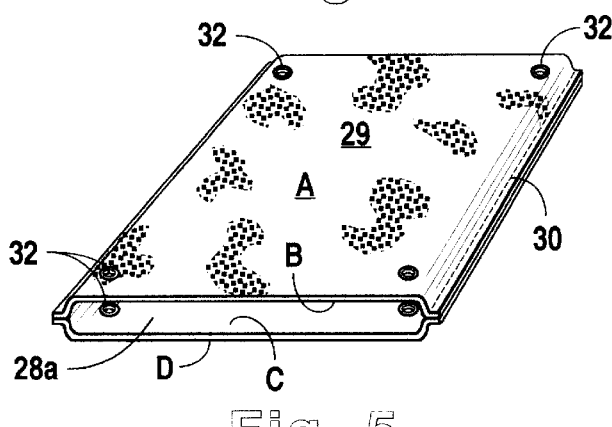
FIG. 5 is an elevational view (cut away) of a sleeve of Applicant's present invention illustrating the four sides, each having its unique pattern.

Turning now to FIGS. 4 and 5, details of sleeve (17) may be appreciated. It is seen that sleeve (17) is made up of four plies, each ply having a different design thereon, thus allowing the hunter to use one of four different designs to best blend in with the particular background representing the countryside in which he is hunting. Four representative sides or plies are designated A, B, C, and D. It is seen that the four sides are sewn together at seam (30) along a pair of opposite sides defining a width for the sleeve that is slightly greater than the width of the frame (as measured from side rail to side rail), thus allowing the sleeve to slide over the frame.

Figure 3:
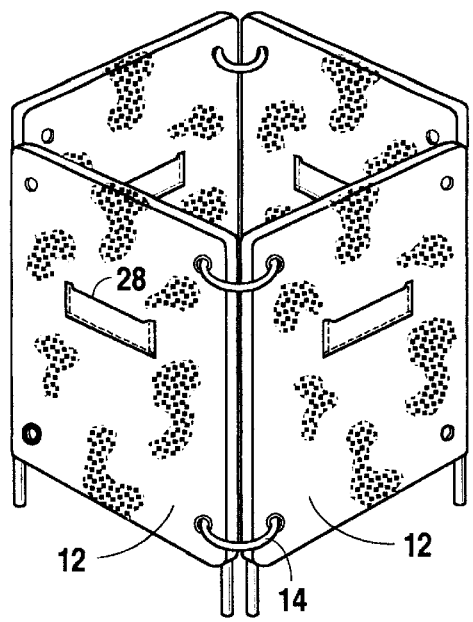
FIG. 3 is a perspective view illustrating the hunting blind of Applicant's present invention being used in conjunction with a second 2-panel blind of Applicant's present invention in the working environment.

For the sake of example, let's suppose side A is pretty much solid olive green in a camouflage pattern. Side B is, again for the sake of example, sand colored with side C having a mottled green/brown color, and side D a buff/gray/green mottled appearance. FIG. 3 then illustrates how a hunter may utilize hunting blind (10) with an appropriate side turned out, here side C representing the green/brown background which the hunter had selected to best fit in with the countryside in which he is hunting. Further, it is seen that, with respect to FIG. 3, this particular hunter has used a second 2-paneled blind to more fully enclose him and better hide his presence from unsuspecting animals.

It is further seen with reference to FIGS. 1–5 that each ply or wall (12) may have a grommet (32) near the corner thereof, which grommet will align with holes (27) for receipt of fastener means (14) therethrough, which fastener means will both maintain the sleeve on the frame and will also hold one panel adjacent the second panel (or even a third or fourth panel, as may be necessary).

Figure 6:
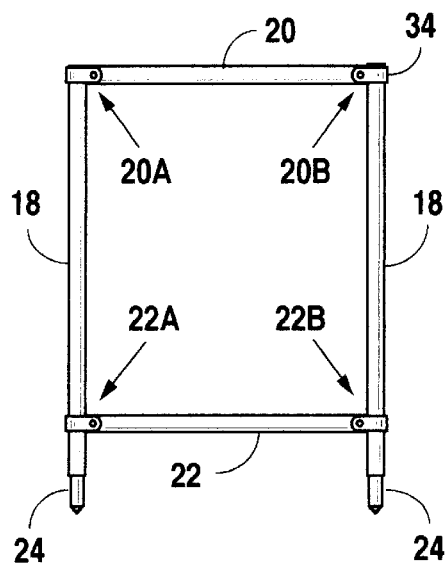
FIG. 6 is a side elevational view of an alternate preferred embodiment of a frame of Applicant's present invention wherein the side rails are detachable from the top and bottom rails of the frame.
Figure 7:
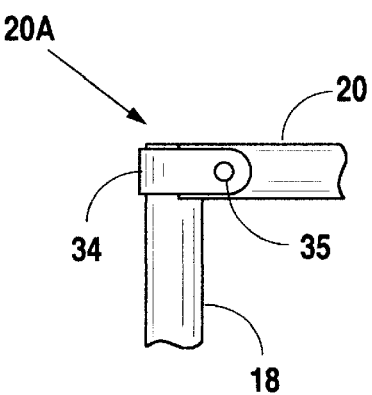
FIG. 7 is a side elevational view of the corner of the frame illustrated in FIG. 6 showing how a bracket is used to join the side rails to the top and bottom rails.

FIG. 6 illustrates an alternate preferred embodiment of frame (16), this embodiment being made from aluminum tubing, such as 6061-T6 aircraft grade aluminum tubing or 4043-T3 grated tubing 1½", 0.048" wall. The use of such aluminum tubing in side rails (18) and top and bottom rails (20) and (22) obviously makes for a lighter frame, but sacrifices the stability of the weight of the angle iron frame illustrated in FIGS. 1–5. Further, the frame illustrated in FIG. 6 may feature quick-release top and bottom rails to allow the frame to fold up, that is, with the top, bottom, and side rails all joining together and being wrapped up in the sleeves for ease of transport.

Figure 8:
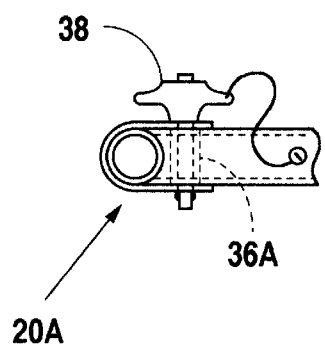
FIG. 8 is a top elevational view of the method of joining the frame of FIG. 6 using the bracket illustrated in FIG. 7.
Figure 9:
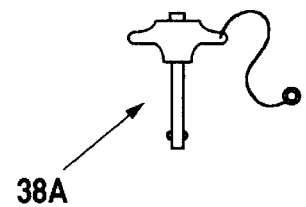
FIG. 9 is a fastening means, illustrated here in side elevational view as a ball-lock pin for fastening together the frame illustrated in FIG. 6.

The structure that allows the folding feature includes brackets (34) for attaching along the side rails where the top and bottom rails join, the brackets having holes (35) at the removed end thereof and capable of joining ends (22A) or (22B) of the top or bottom rails respectively, which ends may be curved to flushly abut the side rails and further which ends may be bushed with a bushing (36a), such as copper tubing as illustrated in FIG. 8. In any case, the top and bottom rails are joined to the side rails by use of the bracket in conjunction with a fastener (38) such as the ball-lock fastener (38A) illustrated in FIG. 9 (with a lanyard attached to the handle for, in turn, attaching to the aluminum tubing) or a nut and bolt combination (not shown).

Figure 10:
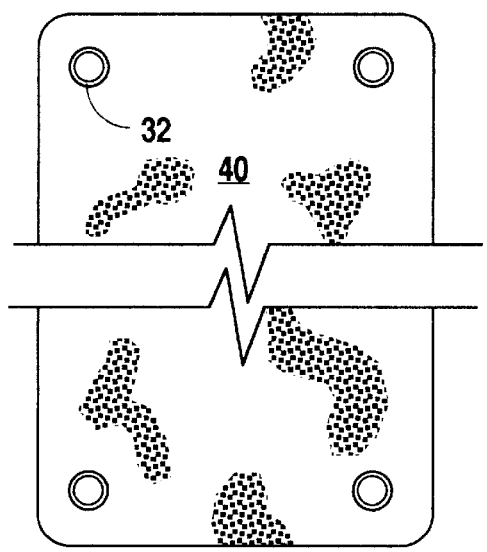
FIG. 10 is a side elevational view of an auxiliary sleeve of Applicant's present invention.

FIG. 10 illustrates an auxiliary sleeve (40) with grommets (32) therein which may be used to lay across the seam where the boundary of one panel joins the other to cover up the gap. Again, this auxiliary sleeve would be 4-ply to match the plies of the sleeves.

Figure 11:
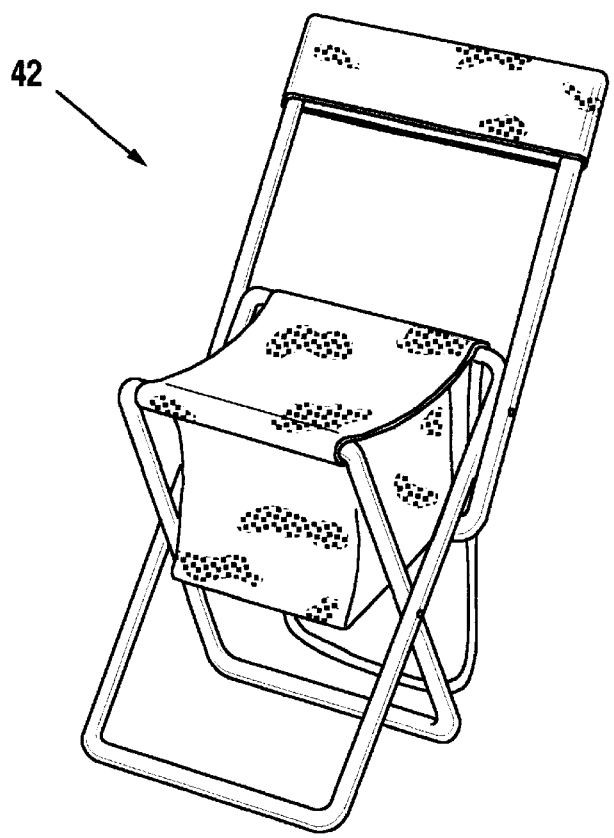
FIG. 11 is a side elevational view of a folding stool/chair used in conjunction with Applicant's present invention as part of a unique kit.
Figure 12:
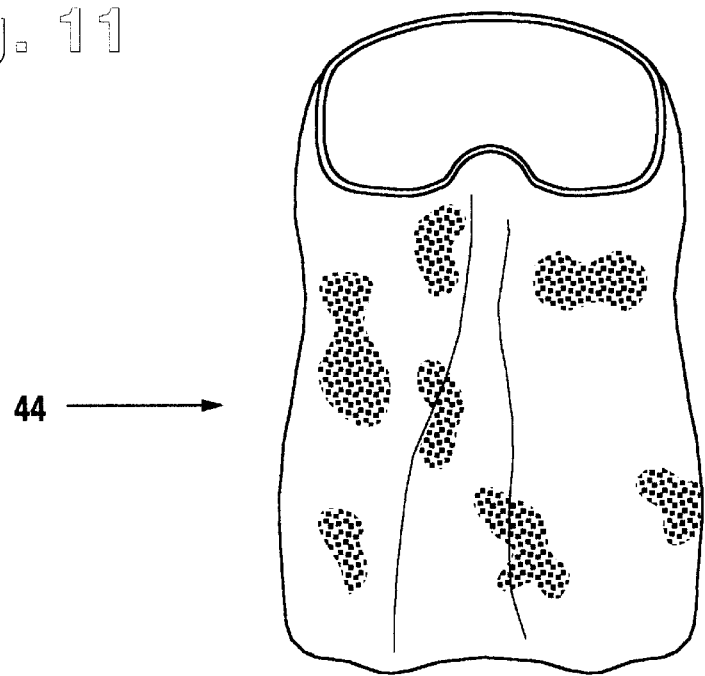
FIG. 12 is a side elevational view of a camouflage facemask or facemask/headcover made with netting which is used as part of a kit in conjunction with Applicant's unique hunting blind.

FIGS. 11 and 12 illustrate a foldable stool (42) and a camouflage facemask or facemask/headcover (44) made of netting. These are included to provide for a kit in which a hunter may carry which would include the hunting blind, the folding stool, and the facemask or facemask/headcover.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A hunting blind comprising:
    a first frame having two vertical side rails, a horizontal top and bottom rails transversely mounted to said vertical side rails forming a front and back side of said first frame;
    a first pair of vertical legs attached to said rails and extending below said side rails for ground insertion;
    a first sleeve having four sides with each side having a different camoflage pattern;
    a seam formed in said first sleeve formed by sewing such that two sides are located on an inside of said first sleeve and two sides are located on an outside of said first sleeve;
    said first sleeve having width slightly greater that a width of said first frame;
    said first sleeve is mounted over said first frame and two camoflage patterns can be seen, one pattern on said front side and another pattern on said back side; whereby said first sleeve can be removed from said first frame and said first sleeve can be turned inside out and mounted on said first frame such that two different camoflage patterns can be seen.

2. The hunting blind of claim 1, further comprising:
    a second frame having two vertical side rails, a horizontal top and bottom rails transversely mounted to said vertical side rails forming a front and back side of said second frame;
    a second pair of vertical legs attached to said rails and extending below said side rails for ground insertion;
    a second sleeve having four sides with each side having a different camoflage pattern;
    a seam formed in said second sleeve formed by sewing such that two sides are located on an inside of said second sleeve and two sides are located on an outside of said second sleeve;
    said second sleeve having width slightly greater that a width of said second frame;
    said second sleeve is mounted over said second frame and two camoflage patterns can be seen, one pattern on said front side and another pattern on said back side;
    whereby said second sleeve can be removed from said second frame and said second sleeve can be turned inside out and mounted on said second frame such that two different camoflage patterns can be seen.

3. The hunting blind of claim 1 wherein the first frame is made from angle iron.

4. The hunting blind of claim 2 wherein the second frame is made from angle iron.

5. The hunting blind of claim 2 further including means for joining the first frame to the second frame.

6. The hunting blind of claim 1 wherein the top and bottom rails of said first frame are removably attached to the side rails of said first frame.

7. The hunting blind of claim 2 wherein the top and bottom rails of said second frame are removably attached to the side rails of said second frame.

8. The hunting blind of claim 2 wherein the top and bottom rails of said first frame are removably attached to the side rails of said first frame and wherein the top and bottom rails of said second frame are removeably attached to the side rails of said second frame and further including means joining said first frame to said second frame.

9. The hunting blind of claim 1 wherein the rails of said first frame are foldably attached to one another.

10. The hunting blind of claim 2 wherein the rails of said second frame are foldably attached to one another.

11. The hunting blind of claim 1 wherein said first sleeve is made of cloth.

12. The hunting blind of claim 2 wherein said second sleeve is made of cloth.

* * * * *